United States Patent
Kobori et al.

(10) Patent No.: US 11,572,032 B2
(45) Date of Patent: Feb. 7, 2023

(54) VEHICLE BODY UPPER STRUCTURE

(71) Applicant: HONDA MOTOR CO., LTD., Tokyo (JP)

(72) Inventors: Hiroshi Kobori, Tokyo (JP); Kazunori Hida, Tokyo (JP); Ryoichi Kakioka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/569,539

(22) Filed: Jan. 6, 2022

(65) Prior Publication Data

US 2022/0219639 A1 Jul. 14, 2022

(30) Foreign Application Priority Data

Jan. 13, 2021 (JP) .............................. JP2021-003414

(51) Int. Cl.
  *B60R 22/24* (2006.01)
  *B60R 22/18* (2006.01)

(52) U.S. Cl.
  CPC ...... *B60R 22/24* (2013.01); *B60R 2022/1818* (2013.01)

(58) Field of Classification Search
  CPC .................................................. B60R 22/24
  See application file for complete search history.

(56) References Cited

U.S. PATENT DOCUMENTS

| | | | | |
|---|---|---|---|---|
| 5,733,013 | A | * 3/1998 | Brown | ............... B60N 2/688 |
| | | | | 297/483 |
| 2005/0017497 | A1 | * 1/2005 | Hirotani | ............... B60R 22/023 |
| | | | | 280/807 |
| 2020/0307506 | A1 | * 10/2020 | Okamoto | ............... B60R 22/24 |

FOREIGN PATENT DOCUMENTS

| | | | | |
|---|---|---|---|---|
| DE | 102008039139 A1 | * 2/2009 | | ......... B60R 22/24 |
| JP | 2005041286 A | * 2/2005 | | ......... B60R 22/023 |
| JP | 2010179705 A | * 8/2010 | | ......... B60R 22/24 |
| JP | 2012101720 A | * 5/2012 | | |
| JP | 5477536 | 4/2014 | | |
| JP | 5485126 | 5/2014 | | |
| JP | 5499134 B2 | * 5/2014 | | |
| KR | 101230833 B1 | * 2/2013 | | |
| WO | WO-2016021051 A1 | * 2/2016 | | ......... B60R 22/24 |

* cited by examiner

*Primary Examiner* — Nicole T Verley
(74) *Attorney, Agent, or Firm* — Amin, Turocy & Watson, LLP (57) ABSTRACT

The vehicle body upper structure includes a rear roof rail, a retractor, a webbing, and an anchor. The rear roof rail extends along a roof panel of the vehicle body. The retractor is housed inside the rear roof rail and is fixed to the rear roof rail with a first fastening bolt. For example, the webbing is pulled out in a pull-out direction orthogonal to an axis of the first fastening bolt. A through ring changes a stretching direction of the webbing that restrains an occupant with the webbing to have an acute angle with respect to the pull-out direction.

7 Claims, 9 Drawing Sheets

VEHICLE BODY UPPER STRUCTURE

CROSS-REFERENCE TO RELATED APPLICATION

Priority is claimed on Japanese Patent Application No. 2021-003414, filed in Japan on Jan. 13, 2021, the entire content of which is incorporated herein by reference.

BACKGROUND OF THE INVENTION

Field of the Invention

The present invention relates to a vehicle body upper structure.

Description of Related Art

As a vehicle body upper structure, for example, a structure is known in which, in an upper portion of a rear pillar, a retractor capable of winding up and pulling out a seat belt (that is, a webbing) is attached toward a vehicle interior on a surface (an inner surface) facing the vehicle interior. This retractor, for example, supports, in a rear seat, a webbing for restraining a central occupant seated in line with three occupants in a vehicle width direction so that the webbing can be wound up and pulled out (see, for example, Japanese Patent No. 5485126).

As a vehicle body upper structure, for example, a structure in which a retractor is provided inside a gate upper portion of a lift gate is known. This retractor, for example, supports, in a rear seat, a webbing for restraining a central occupant seated in line with three occupants in a vehicle width direction so that the webbing can be wound up and pulled out (see, for example, Japanese Patent No. 5477536).

SUMMARY OF THE INVENTION

However, in the retractor disclosed in Japanese Patent No. 5485126, in the upper portion of the rear pillar, the retractor is attached toward the vehicle interior on the inner surface facing the vehicle interior. For this reason, for example, it is conceivable that the retractor protrudes so as to protrude toward the vehicle interior to narrow a space of the vehicle interior (hereinafter, it may be referred to as a vehicle interior space).

In the retractor of Japanese Patent No. 5477536, the retractor is provided inside the gate upper portion of the lift gate. Here, for example, when an occupant is restrained and protected by the webbing, a relatively large load acts on the retractor from the webbing. Therefore, for example, it is necessary to reinforce a mounting portion of the retractor in the gate upper portion to support the retractor. Therefore, for example, it is conceivable that weight of the mounting portion of the retractor increases by reinforcing the mounting portion.

Aspects of the present invention have been made in view of such circumstances, and an object thereof is to provide a vehicle body upper structure that can secure a large vehicle interior space without being affected by a retractor and can further reduce reinforcement and weight of a retractor mounting portion for mounting the retractor.

In order to solve the above problems and achieve the object, the present invention adopts the following aspects.

(1) A vehicle body upper structure according to an aspect of the present invention includes: a rear roof rail extending along a roof panel of a vehicle body; a retractor housed inside the rear roof rail and fixed to the rear roof rail by a mounting member; a seat belt capable of pulling out in a pull-out direction intersecting an axis of the mounting member; and a through ring configured to change a stretching direction of the seat belt that restrains an occupant with the seat belt to have an acute angle with respect to the pull-out direction.

According to the above aspect (1), the retractor is housed inside the rear roof rail, and the retractor is fixed to the rear roof rail by the mounting member. Therefore, it is possible to prevent the retractor from protruding so as to protrude into a vehicle interior space. This makes it possible to secure a large vehicle interior space without being affected by the retractor.

Here, the rear roof rail is a member having high rigidity and strength that forms a rear framework of a roof. Further, the seat belt pulled out from the retractor can be pulled out in the pull-out direction intersecting the axis of the mounting member. That is, the pull-out direction of the seat belt can be a shearing direction intersecting the axis of the mounting member. Therefore, for example, it is possible to increase strength and rigidity of the rear roof rail against a load acting on the rear roof rail from the mounting member. As a result, it is possible to reduce reinforcement and weight of a retractor mounting portion for mounting the retractor on the rear roof rail by the mounting member.

In addition, the stretching direction of the seat belt that restrains the occupant is changed to have the acute angle with respect to the pull-out direction by the through ring. Therefore, in a belt load acting on the rear roof rail via the through ring by the seat belt restraining the occupant, a first component force (vertical component) orthogonal to the rear roof rail can be made larger than a second component force (horizontal component) along the rear roof rail. In other words, the second component force along the rear roof rail can be made smaller than the first component force orthogonal to the rear roof rail.

Hereinafter, the belt load acting on the rear roof rail via the through ring by the seat belt restraining the occupant may be referred to as a "belt stretching load", the first component force may be referred to as a "large first component force", and the second component force may be referred to as a "small second component force".

That is, the belt stretching load can be dispersed into the large first component force received by the rear roof rail and the small second component force received by the retractor. The large first component force can be supported by the rear roof rail. The small second component force acts on the retractor mounting portion via the retractor and the mounting member. Therefore, the load acting on the retractor mounting portion via the retractor and the mounting member can be reduced. Accordingly, the reinforcement and weight of the retractor mounting portion can be further reduced.

(2) In the above aspect (1), a bracket configured to couple the retractor and the through ring may be provided.

According to the above aspect (2), the retractor and the through ring are coupled by the bracket. Therefore, a part of the small second component force along the rear roof rail can be handled and supported by the bracket. As a result, for example, it is not necessary to increase the strength and rigidity of the retractor mounting portion of the rear roof rail more than necessary by reinforcement, and it is possible to further reduce the reinforcement and weight of the retractor mounting portion.

Further, the retractor and the through ring can be assembled to the rear roof rail in a state of being integrally coupled by the bracket. Thus, workability of assembling the retractor and the through ring (that is, a seat belt device) can be improved.

(3) In the above aspect (2), the bracket may include one end to which the through ring is attached by a through ring mounting member and another end to which the retractor is attached, and the another end side may be wider than the one end side.

According to the above aspect (3), the retractor is attached to the wide other end with the another end of the bracket wider than the one end thereof. The through ring is attached to the one end of the bracket by the through ring mounting member. That is, the small second component force along the rear roof rail can be transmitted to the one end of the bracket via the through ring mounting member. Therefore, the small second component force along the rear roof rail can be more favorably dispersed toward the bracket. As a result, the one end side of the bracket can be made narrower than the another end side, and the bracket can be made lightweight.

(4) In the above aspect (2), the bracket may extend in the vehicle width direction along the rear roof rail and include a fastening hole into which a fastening member that attaches the bracket to the rear roof rail is able to be inserted, and the fastening hole may be located between the through ring and the retractor in the vehicle width direction. According to the above aspect (4), the fastening hole is formed in the bracket, and the bracket is attached to the rear roof rail by the fastening member inserted into the fastening hole. Further, this fastening hole is disposed between the through ring and the retractor. As a result, for example, even when the through ring and the retractor are largely separated to some extent, the fastening member can suppress fluttering of the bracket due to vehicle body vibration or a load acting from the seat belt.

(5) In the above aspect (4), the bracket may have one end to which the through ring is attached by a through ring mounting member, another end to which the retractor is attached, and a wide portion wider than the one end from the one end to the fastening hole and from the fastening hole to the another end.

According to the above aspect (5), the bracket has the one end, the wide portion, and the another end, and the wide portion is formed to be wider than the one end from the one end to the fastening hole and from the fastening hole to the another end. Therefore, for example, the fastening hole into which the fastening member can be inserted can be formed in the wide portion. As a result, in the bracket, a periphery of a fastening portion attached to the rear roof rail by the fastening member (that is, a periphery of the fastening hole) can be reinforced by the wide portion.

Therefore, for example, it is possible to enhance strength and rigidity of the bracket against a force applied in a direction in which the bracket is separated from the rear roof rail by vehicle body vibration or a load acting from the seat belt.

(6) In the above aspect (5), the wide portion may include an endless bead surrounding the fastening hole.

Here, for example, by providing the fastening hole in the wide portion, strength and rigidity of the periphery of the fastening hole can be suppressed to be low. Therefore, in the above aspect (6), the endless bead is formed in the wide portion of the bracket, and the fastening hole is surrounded by the bead. Accordingly, the strength and rigidity of the periphery of the fastening hole can be ensured by the endless bead.

(7) In the above aspect (1), the rear roof rail may be supported by a rear pillar, the rear roof rail may have an end on an outer side in a vehicle width direction overlapped with an upper end of the rear pillar, and the through ring may be attached to a portion where the upper end and the end are overlapped with each other by a through ring mounting member.

According to the aspect (7), the end of the rear roof rail is overlapped with the upper end of the rear pillar to ensure high strength and rigidity of the overlapped portion. Further, the through ring is attached to the overlapped portion by the through ring mounting member. Therefore, in the belt stretching load, the large first component force orthogonal to the rear roof rail can be handled and supported by the overlapped portion.

As a result, for example, it is not necessary to increase the strength and rigidity of the portion to which the through ring is attached (that is, the overlapped portion and a periphery of the overlapped portion) more than necessary by reinforcement, and an increase in weight due to the reinforcement can be suppressed.

According to the aspects of the present invention, it is possible to secure a large vehicle interior space without being affected by the retractor, and it is possible to reduce reinforcement and weight of the retractor mounting portion to which the retractor is attached.

DETAILED DESCRIPTION OF THE INVENTION

Hereinafter, a vehicle body upper structure 10 according to an embodiment of the present invention will be described with reference to the drawings. In the drawings, an arrow FR indicates the front of the vehicle, an arrow UP indicates an upper side of the vehicle, and an arrow LH indicates a left side of the vehicle. The use, type, and the like of the vehicle are not particularly limited, but an automobile will be described as an example as the embodiment. A vehicle body upper structure 10 is a structure formed substantially symmetrically. A configuration on a right side will be described below, and description of a configuration on the left side will be omitted.

<Vehicle>

Figure 1:
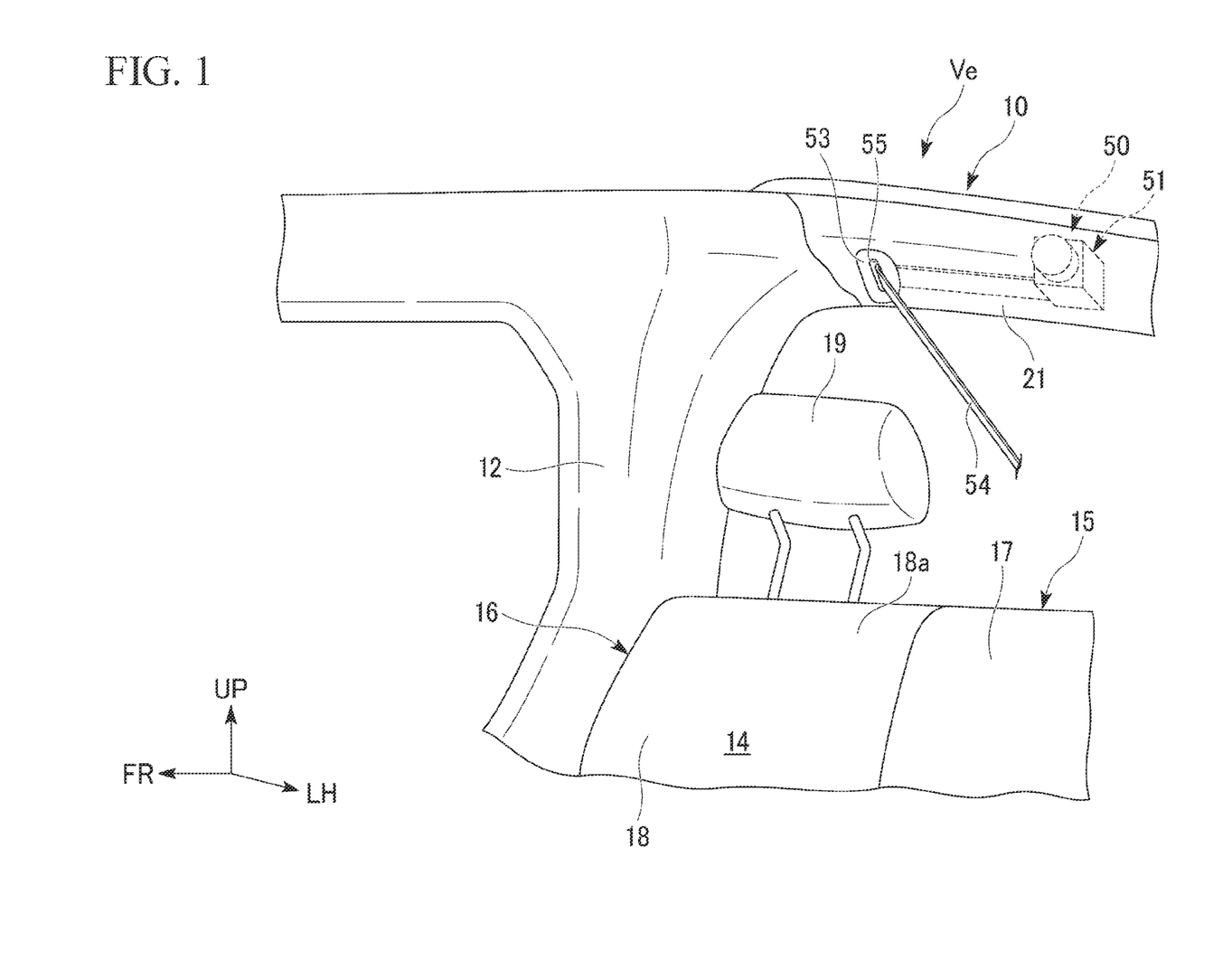
FIG. 1 is a perspective view of a vehicle body upper structure according to an embodiment of the present invention as viewed from a vehicle interior side.

As illustrated in FIG. 1, a vehicle Ve includes, for example, the vehicle body upper structure 10 constituting an upper portion of a vehicle body, a rear pillar (quarter pillar) 12 supporting the vehicle body upper structure 10, and a seat 15 for three persons provided at a rear portion of a vehicle interior 14.

The vehicle body upper structure 10 (including a seat belt device 50), the rear pillar 12, and the like are covered with an interior garnish 21 from the vehicle interior 14 side. In the vehicle body upper structure 10, an anchor (that is, a through ring) 53 of the seat belt device 50 to be described later protrudes from the garnish 21 toward the vehicle interior 14. A webbing (that is, a seat belt) 54 is inserted in a second guide hole 55 of the anchor 53.

<Seat for Three Persons>

The seat 15 for three persons is a rear seat provided in a third row from the front of the vehicle body toward the rear of the vehicle body. The seat 15 for three persons includes a right seat 16, a left seat (not shown), and a center seat 17 on which three persons can sit side by side in a vehicle width direction. The right seat 16 and the left seat are provided on a right outer side and a left outer side in the vehicle width direction. In each of the right seat 16 and the left seat, a headrest 19 is attached to an upper portion 18a of a seat back 18 (a seat back and a headrest of the left seat are not illustrated). The center seat 17 is provided between the right seat 16 and the left seat at the center in the vehicle width direction.

<Rear Pillar>

Figure 2:
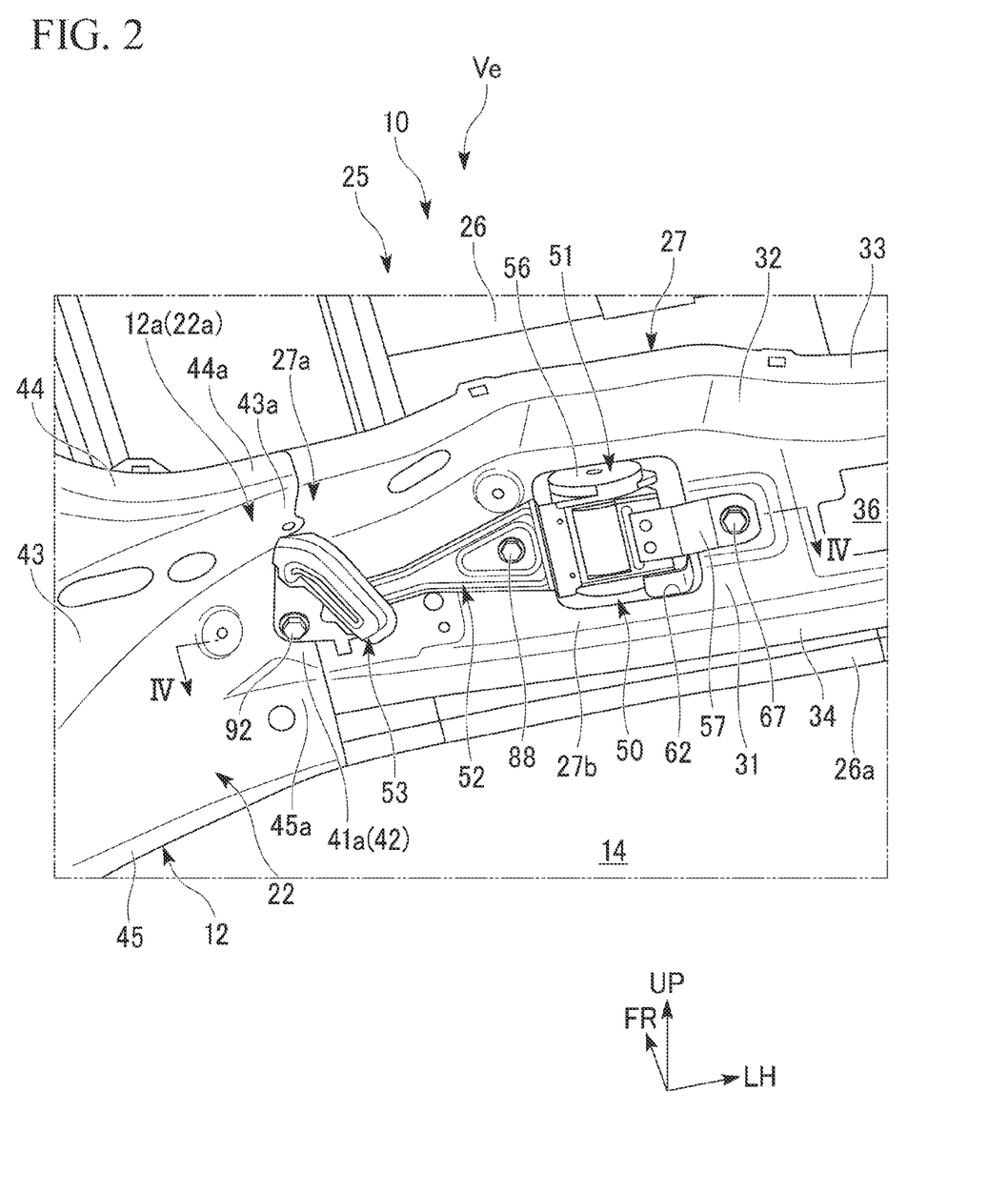
FIG. 2 is a perspective view of a state in which a seat belt device is provided on a rear roof rail of the vehicle body upper structure according to the embodiment as viewed from the vehicle interior side.

As illustrated in FIGS. 1 and 2, the rear pillar 12 is raised upward from a rear end of a rear frame (not illustrated). The rear frame is, for example, a member having high rigidity which is formed in a rectangular closed cross section and forms a part of a framework in a lower portion of the vehicle body. The rear pillar 12 is, for example, a member having high rigidity which is formed in a rectangular closed cross section by an outer panel (not illustrated) and an inner panel 22 and forms a part of a framework in a rear portion of the vehicle body.

For example, a right rear end of the vehicle body upper structure 10 (that is, an outer end 27a of a rear roof rail 27 to be described later) is joined to an upper end 12a of the rear pillar 12.

<Vehicle Body Upper Structure>

The vehicle body upper structure 10 includes, for example, a roof 25 and the seat belt device 50. The roof 25 includes, for example, a roof panel 26 and the rear roof rail 27. The roof panel 26 is disposed above the vehicle interior 14 (that is, above the rear pillar 12), and is formed in a substantially rectangular shape in plan view.

The rear roof rail 27 is bridged between the upper ends 12a (only the right upper end is illustrated) of the rear pillar 12 provided on the right outer side in the vehicle width direction and a rear pillar provided on the left outer side in the vehicle width direction (not illustrated). The rear roof rail 27 is disposed above the seat 15 for three persons in a state of being supported by the rear pillar 12 on the right outer side and the rear pillar on the left outer side.

Specifically, the rear roof rail 27 includes, for example, a rail bottom 31, a rail front wall 32, a front rail flange 33, and a rear rail flange 34.

The rail bottom 31 is disposed on the vehicle interior 14 side with respect to the roof panel 26, and extends substantially horizontally along a rear end 26a of the roof panel 26. The rail front wall 32 is raised substantially vertically from a front side of the rail bottom 31 toward an upper side (the rear end 26a of the roof panel 26). The front rail flange 33 protrudes from an upper side of the rail front wall 32 toward the front of the vehicle body. The rear rail flange 34 protrudes from a rear side of the rail bottom 31 toward the rear of the vehicle body.

The front rail flange 33 and the rear rail flange 34 are joined to the rear end 26a of the roof panel 26 from the vehicle interior 14 side. In this state, the rear roof rail 27 is provided to protrude toward the vehicle interior 14 in the rear end 26a of the roof panel 26, and extends along the rear end 26a of the roof panel 26 in the vehicle width direction. The rear roof rail 27 is a member having high rigidity that forms a rear framework of the roof 25.

Here, a rectangular closed cross section is formed by the rear roof rail 27 and the rear end 26a of the roof panel 26. The rear roof rail 27 has, for example, the rectangular closed cross section to ensure strength and rigidity. This rectangular closed cross section forms an internal space 36 in which the seat belt device 50 to be described later can be housed.

Hereinafter, the rectangular closed cross section formed by the rear roof rail 27 and the rear end 26a of the roof panel 26 may be referred to as a "roof rail closed cross section", and the internal space 36 formed by the roof rail closed cross section may be referred to as a "roof rail internal space 36".

The rear roof rail 27 has an outer end on the outer side in the vehicle width direction (an end on an outer side in the vehicle width direction) 27a. The outer end 27a overlaps an upper end 22a of the inner panel 22 in the rear pillar 12 from above (that is, the roof panel 26 side).

Specifically, the rail bottom 31 of the outer end 27a overlaps an upper end 41a of an inner wall 41 in the inner panel 22 from above. Hereinafter, a portion 42 where the rail bottom 31 of the outer end 27a and the upper end 41a of the inner wall 41 in the inner panel 22 are overlapped may be referred to as a "rail bottom overlapped portion 42".

The rail front wall 32 of the outer end 27a overlaps an upper end 43a of a front wall 43 in the inner panel 22 from the rear of the vehicle body. The front rail flange 33 of the outer end 27a overlaps an upper end 44a of a front flange 44 in the inner panel 22 from above. The rear rail flange 34 of the outer end 27a overlaps an upper end 45a of a rear flange 45 in the inner panel 22 from above.

<Seat Belt Device>

Figure 3:
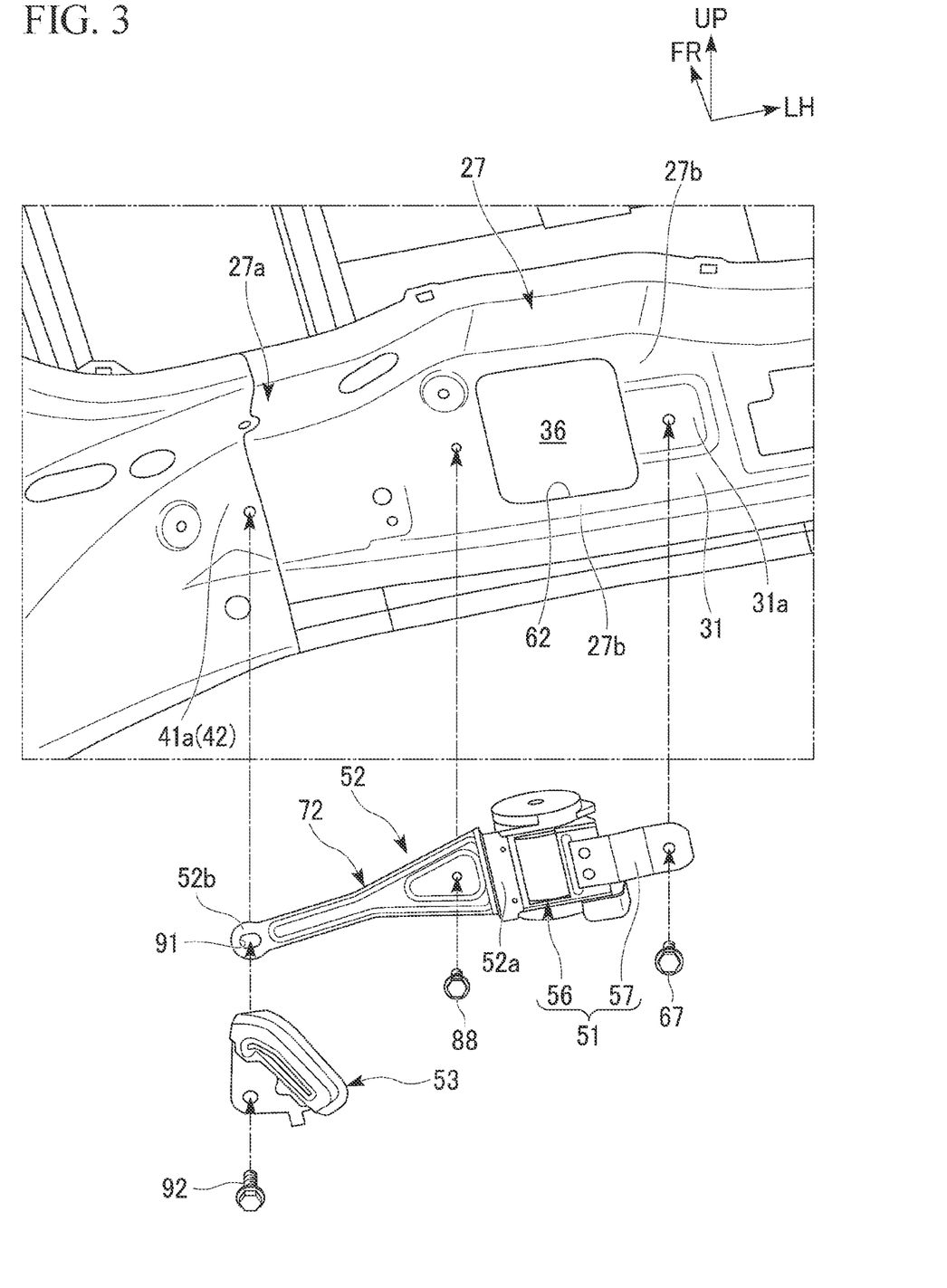
FIG. 3 is an exploded perspective view of the vehicle body upper structure in FIG. 2.
Figure 4:
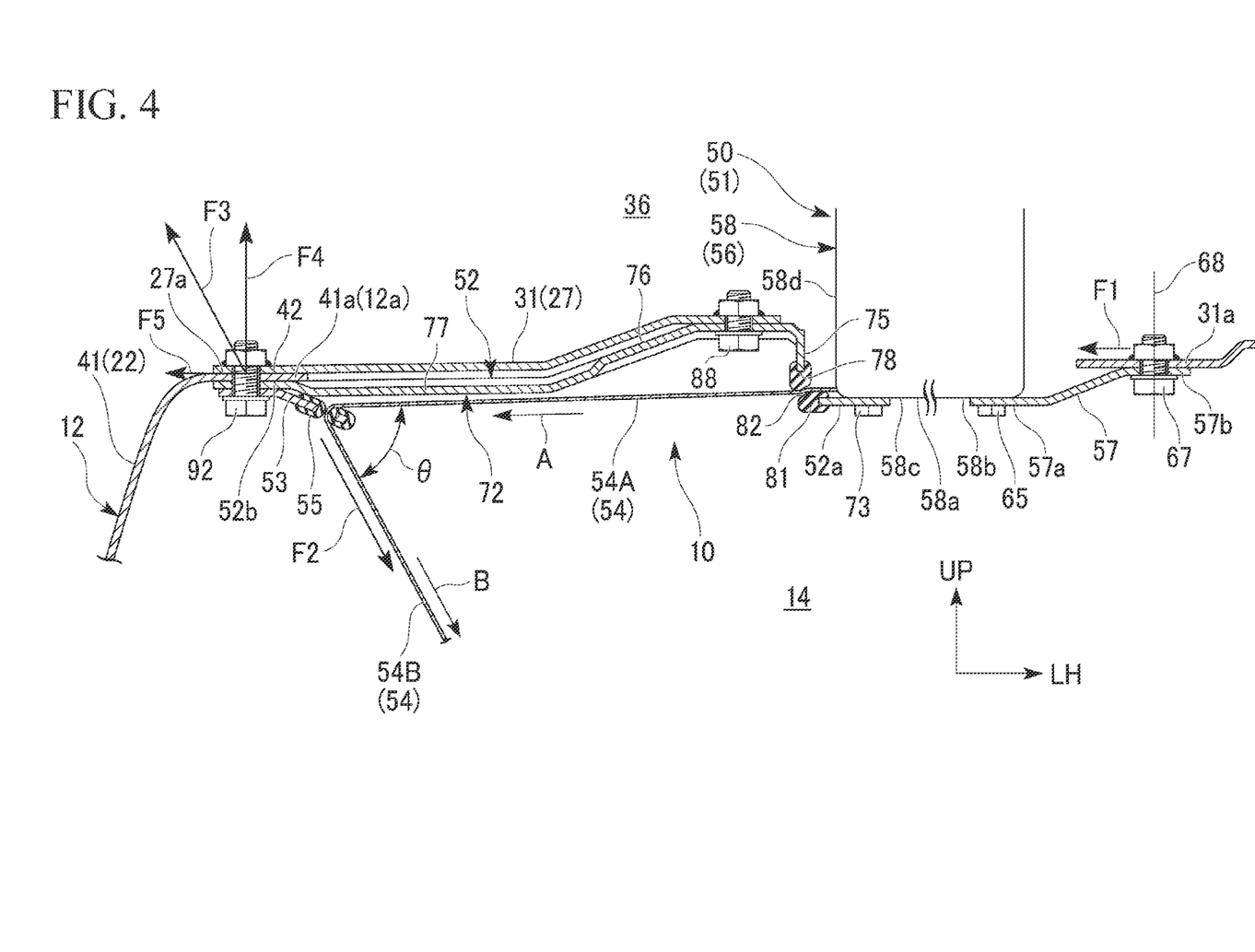
FIG. 4 is a cross-sectional view taken along line IV-IV in FIG. 2.

As illustrated in FIGS. 2 to 4, in the seat belt device 50, main constituent members are provided in a portion of the rear roof rail 27 closer to the outer end 27a. In the seat belt device 50, for example, a retractor 51 and the like as the main constituent members are disposed above the center seat 17 of the seat 15 for three persons (see FIG. 1). The seat belt device 50 is, for example, a device that restrains an occupant seated on the center seat 17 of the seat 15 for three persons.

Specifically, the seat belt device 50 includes, for example, the retractor 51, a bracket 52, the anchor (through ring) 53, and the webbing (seat belt) 54.

(Retractor)

Figure 5:
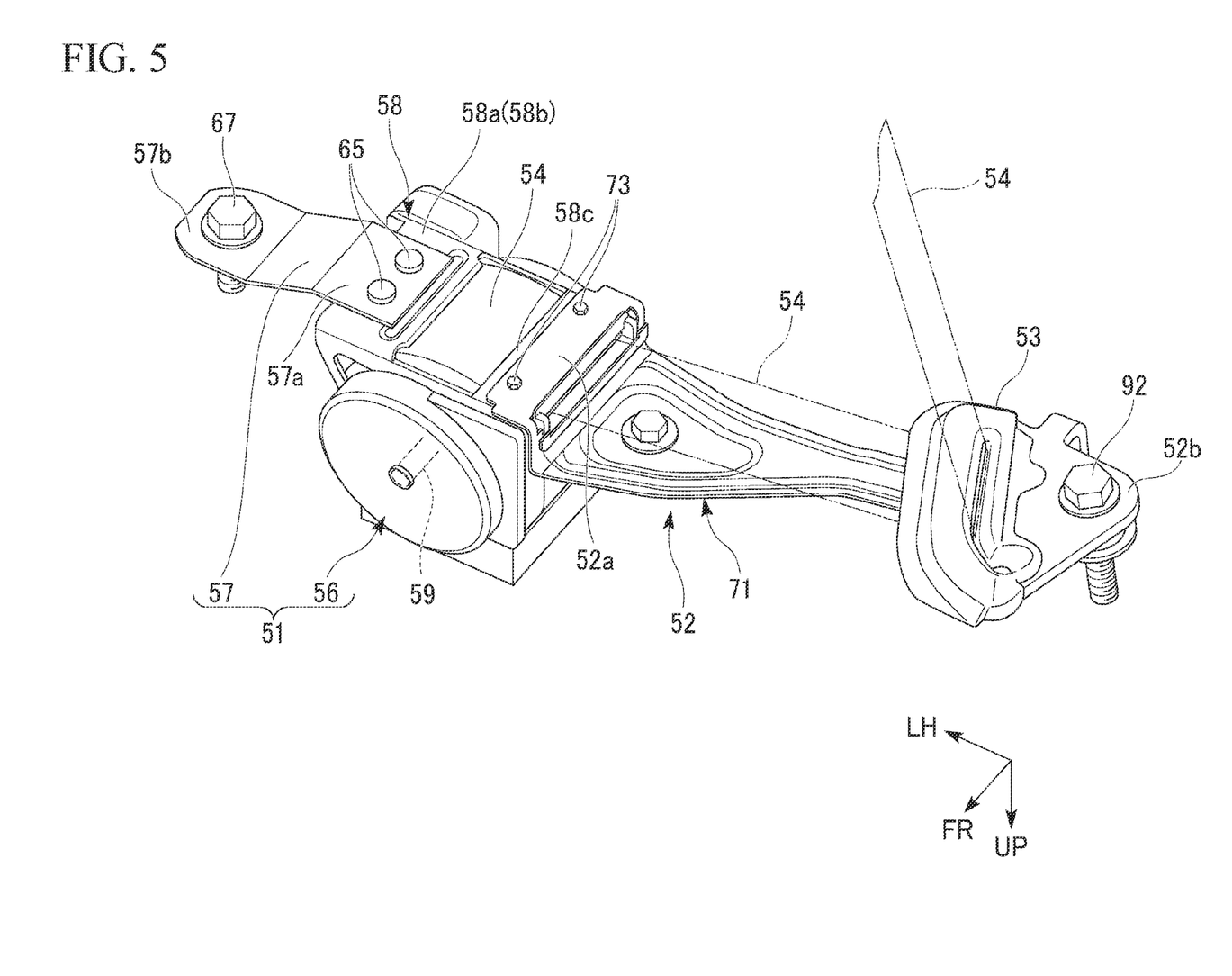
FIG. 5 is a perspective view of the seat belt device according to the embodiment as viewed from below.

As illustrated in FIGS. 2, 3, and 5, for example, the retractor 51 is supported by a support portion 27b of the rear roof rail 27 above the center seat 17 of the seat 15 for three persons (see FIG. 1). The retractor 51 includes, for example, a retractor main body 56 and a retractor bracket 57.

The retractor main body 56 is housed in the roof rail internal space 36 (that is, the inside of the rear roof rail 27) at the support portion 27b of the rear roof rail 27. The retractor main body 56 includes, for example, a casing 58 and a belt winding drum (not illustrated). The belt winding drum is housed inside the casing 58 and is rotatably supported by the casing 58 via a winding shaft 59. A base end (not illustrated) of the webbing 54 is coupled to the belt winding drum, and the webbing 54 is wound around the belt winding drum.

The retractor main body 56 is housed in the roof rail internal space 36 through an opening 62 of the support portion 27b in a state where the winding shaft 59 is disposed in a front-rear direction of the vehicle body. In this state, a lower end 58a of the casing 58 is exposed from the opening 62 toward the vehicle interior 14. A base end 57a of the retractor bracket 57 is attached to an end 58b of the lower end 58a of the casing 58 on the inner side in the vehicle width direction with respect to the winding shaft 59 with a plurality of (two in the embodiment) first mounting bolts (mounting members) 65 from the vehicle interior 14 side.

In the embodiment, two first mounting bolts 65 are exemplified, but the present invention is not limited thereto. In the embodiment, the first mounting bolt 65 is exemplified as the mounting member, but another mounting member such as a rivet may be used.

The retractor bracket 57 protrudes inward in the vehicle width direction along the rail bottom 31 of the rear roof rail 27. In the retractor bracket 57, a distal end 57b is fixed to a retractor mounting portion 31a of the rear roof rail 27 (specifically, the rail bottom 31) by a first fastening bolt (mounting member) 67.

A base end 52a of the bracket 52 is attached to an end 58c of the lower end 58a of the casing 58 on the outer side in the vehicle width direction with respect to the winding shaft 59. The end 58c of the lower end 58a of the casing 58 on the outer side in the vehicle width direction with respect to the winding shaft 59 may be hereinafter referred to as a "casing end 58c".

(Bracket)

Figure 6:
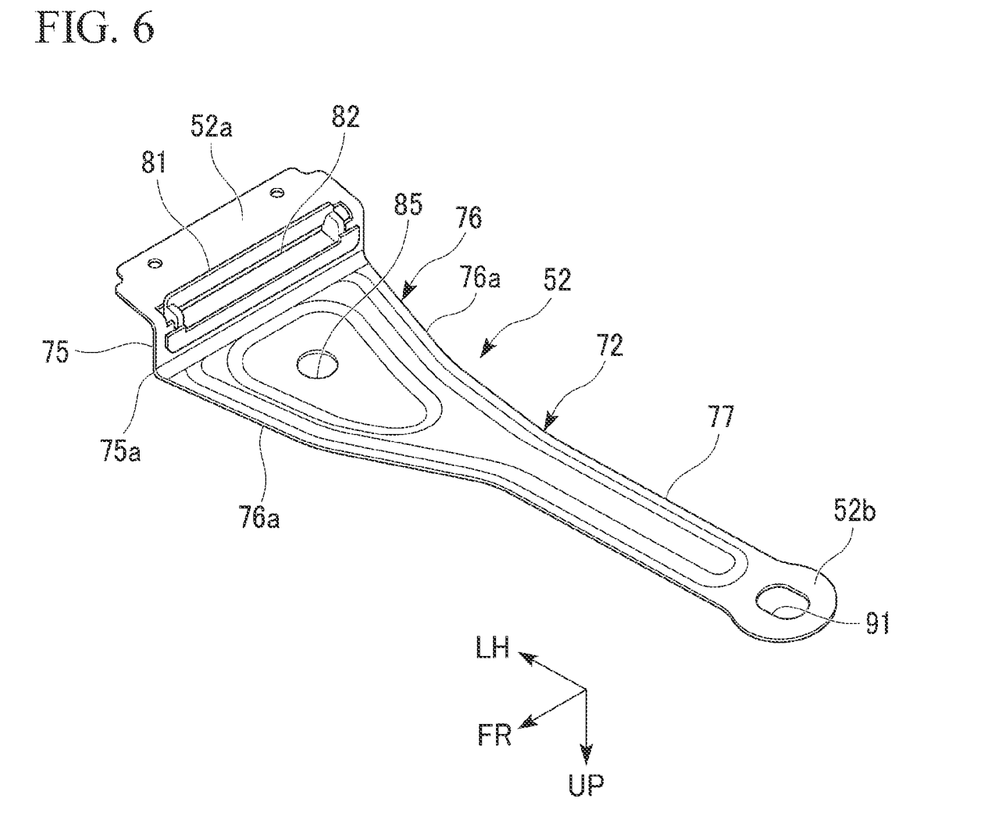
FIG. 6 is a perspective view of a bracket and an escutcheon of the seat belt device illustrated in FIG. 5 as viewed from below.
Figure 7:
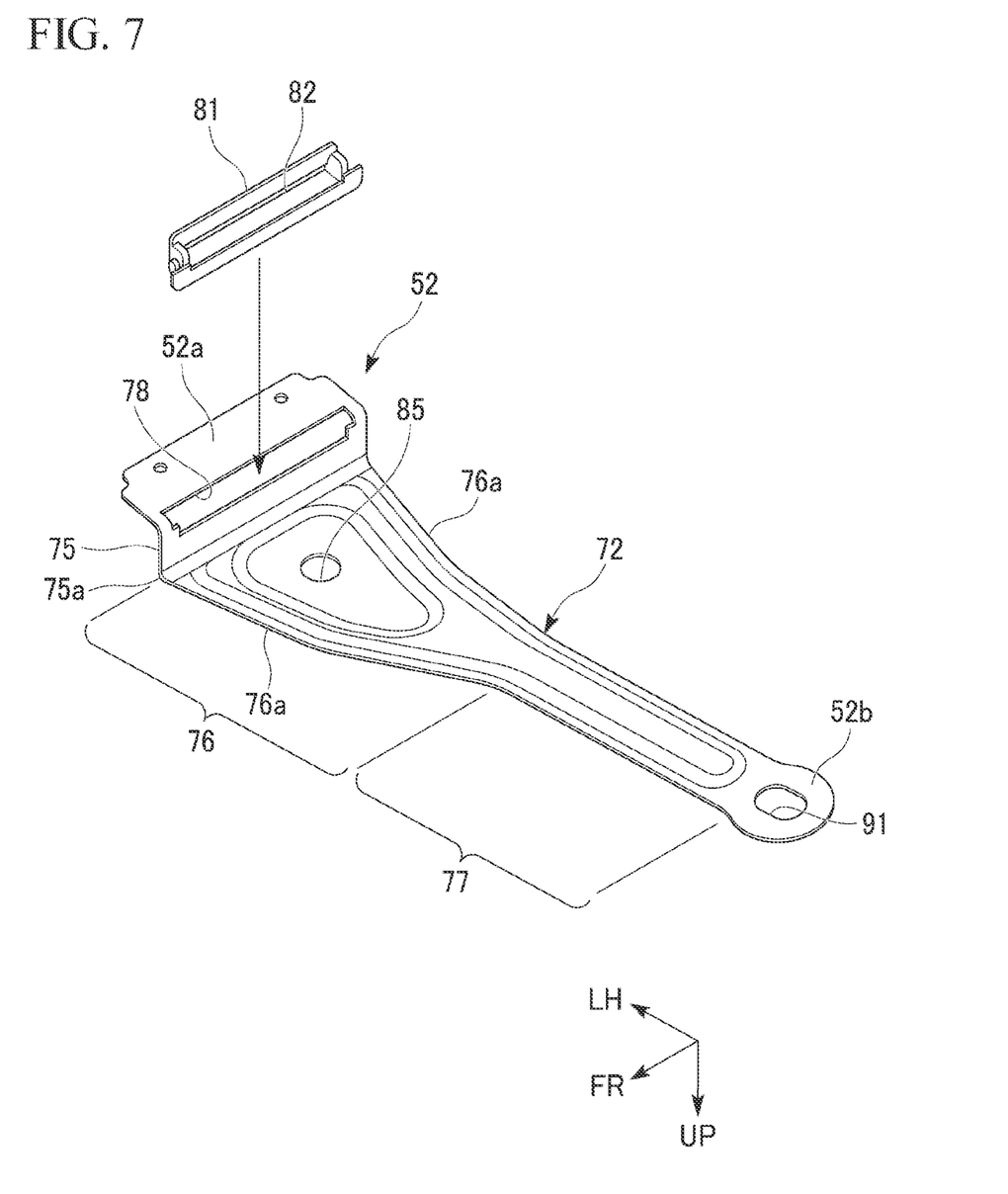
FIG. 7 is an exploded perspective view of the bracket and the escutcheon in FIG. 6.

As illustrated in FIGS. 4, 6, and 7, the bracket 52 extends outward in the vehicle width direction (specifically, the right outer side) from the retractor 51 along the rail bottom 31 of the rear roof rail 27. The bracket 52 has, for example, the base end (another end) 52a, an extending portion 72, and a distal end (one end) 52b.

The base end 52a is attached to the casing end 58c with a plurality of (two in the embodiment) second mounting bolts (mounting members) 73 (see also FIG. 5) from the vehicle interior 14 side. That is, the retractor 51 is attached to the base end 52a of the bracket 52.

In the embodiment, two second mounting bolts 73 are exemplified, but the present invention is not limited thereto. In the embodiment, the second mounting bolt 73 is exemplified as the mounting member, but another mounting member such as a rivet may be used.

The extending portion 72 extends outward in the vehicle width direction from an outer side of the base end 52a on the outer side in the vehicle width direction along the rail bottom 31 of the rear roof rail 27. The extending portion 72 includes an upright portion 75, a wide portion 76, and a coupling portion 77. The upright portion 75 is raised upward along an outer wall 58d of the casing 58 from the outer side of the base end 52a on the outer side in the vehicle width direction. A cross opening 78 is formed at an intersection of the base end 52a and the upright portion 75.

An escutcheon 81 into which the webbing 54 to be described later is slidably inserted is attached to the cross opening 78. The escutcheon 81 is formed of, for example, a resin material, and has a first guide hole 82 through which the webbing 54 can smoothly slide.

Figure 8:
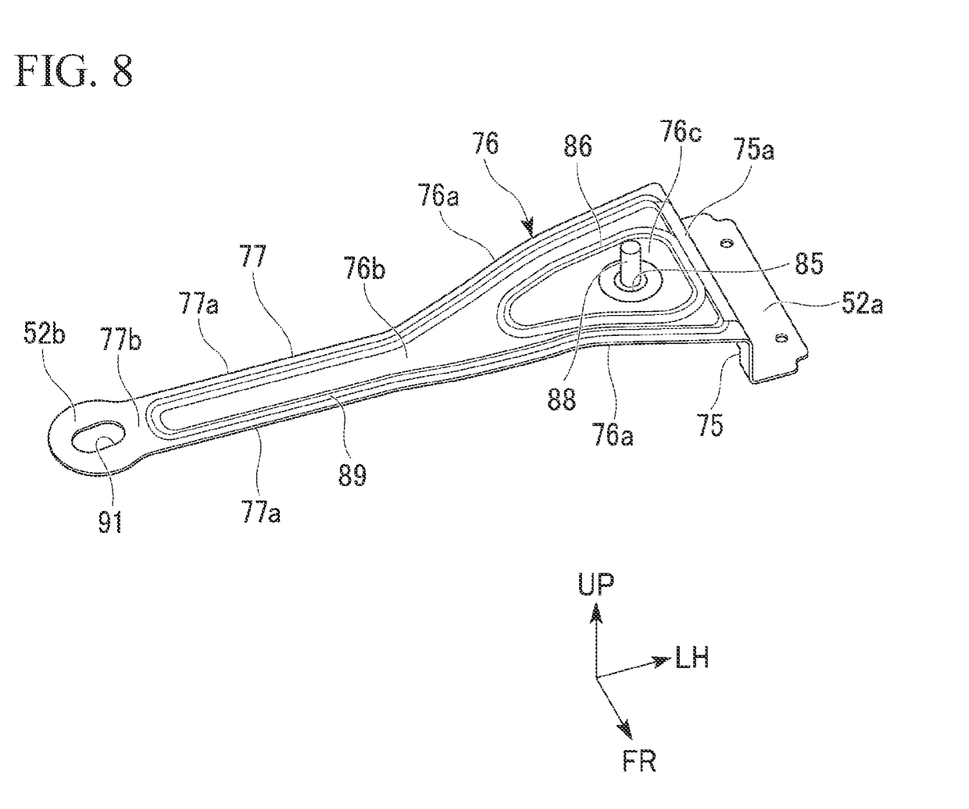
FIG. 8 is a perspective view of the bracket according to the embodiment as viewed from above.
Figure 9:
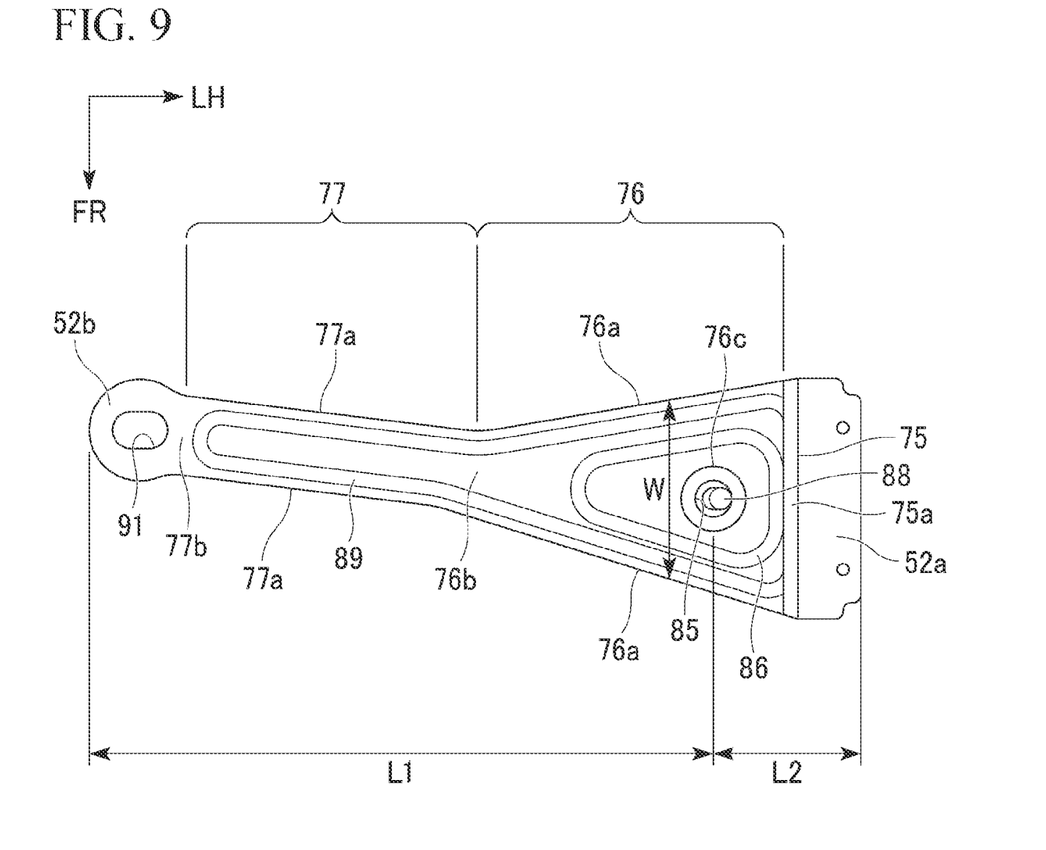
FIG. 9 is a plan view of the bracket in FIG. 8 as viewed from above.

As illustrated in FIGS. 4, 8, and 9, the wide portion 76 extends in an inclined manner such that both sides 76a approach each other as the wide portion 76 extends from an upper side 75a of the upright portion 75 outward in the vehicle width direction (that is, the coupling portion 77). The wide portion 76 is formed in a substantially trapezoidal shape or a triangular shape such that a width W gradually decreases from the upright portion 75 toward the coupling portion 77. In other words, the wide portion 76 is formed to be gradually wider from the coupling portion 77 toward the upright portion 75.

The wide portion 76 has a first fastening hole (fastening hole) 85 and a bead 86. The first fastening hole 85 is formed at the center in the width direction of the wide portion 76 (that is, the center in the front-rear direction of the vehicle body) and at a portion near the upright portion 75. The first fastening hole 85 is opened in a vertical direction so that a second fastening bolt (fastening member) 88 can be inserted thereinto. Further, the first fastening hole 85 is located between the anchor 53 to be described later and the retractor 51 in the vehicle width direction.

The second fastening bolt 88 is inserted into the first fastening hole 85 and fastened to the rail bottom 31 of the rear roof rail 27. Accordingly, the wide portion 76 (that is, the bracket 52) is fixed to the rail bottom 31 by the second fastening bolt 88. In the embodiment, the second fastening bolt 88 is exemplified as the fastening member, but another fastening member such as a rivet may be used.

As described above, the retractor bracket 57 is fixed to the retractor mounting portion 31a by the first fastening bolt 67. Accordingly, the retractor main body 56 is fixed to the rear roof rail 27 (specifically, the rail bottom 31) by the first fastening bolt 67 and the second fastening bolt 88 in a state where the retractor main body 56 is housed in the roof rail internal space 36.

The bead 86 is formed in an endless shape (generally a triangular or annular shape) so as to surround the first fastening hole 85 along both sides 76a of the wide portion 76 and the upright portion 75, for example. The bead 86 is raised upward from a main body of the wide portion 76. Therefore, the wide portion 76 is reinforced by the bead 86.

For example, the coupling portion 77 extends along the rail bottom 31 of the rear roof rail 27 from a wide outer end 76b on the outer side in the vehicle width direction of the wide portion 76 to the distal end 52b. The coupling portion 77 is formed to have the same constant width as the wide outer end 76b, for example. An extending bead 89 is formed along both sides 77a of the coupling portion 77 and both sides 76a of the wide portion 76. The extending bead 89 bulges downward. The coupling portion 77 and the wide portion 76 are reinforced by the extending bead 89.

The distal end 52b is formed at a coupling outer end 77b on the outer side in the vehicle width direction (specifically, the right outer side) of the coupling portion 77. The distal end 52b has, for example, an outer shape formed in a substantially arc shape, and is disposed along the rail bottom overlapped portion 42 (specifically, the upper end 41a of the inner wall 41 in the inner panel 22 of the rear pillar 12).

The distal end 52b has, for example, a second fastening hole 91 formed at the center. The second fastening hole 91 is opened in the vertical direction so that an anchor bolt (through ring mounting member) 92 can be inserted thereinto. In the embodiment, the anchor bolt 92 is exemplified as the through ring mounting member, but another through ring mounting member such as a rivet may be used.

As described above, the bracket 52 has the wide portion 76 wider than the distal end 52b over a range L1 from the distal end 52b to the first fastening hole 85 and a range L2 from the first fastening hole 85 to the base end 52a. That is, the bracket 52 is formed such that the base end 52a side is wider than the distal end 52b side.

The bracket 52 has the distal end 52b. The anchor 53 is overlapped on the distal end 52b from the vehicle interior 14 side. In this state, the distal end 52b is attached to the rail bottom overlapped portion 42 together with the anchor 53 by the anchor bolt 92.

(Anchor)

The anchor 53 is attached to the rail bottom overlapped portion 42 together with the distal end 52b with the anchor bolt 92, whereby the anchor 53 and the retractor 51 are coupled (connected) by the bracket 52. In the anchor 53, the second guide hole 55 into which the webbing 54 can be inserted is made of a resin material. The second guide hole 55 is made of the resin material, so that the webbing 54 is smoothly slidably inserted into the second guide hole 55.

(Webbing)

The webbing 54 is drawn out from the second guide hole 55 of the anchor 53, and a first tongue (not illustrated) is attached to a distal end of the drawn webbing 54. Between the anchor 53 and the first tongue, a second tongue (not illustrated) is slidably fitted in the middle of the webbing 54.

The first tongue is detachably locked to, for example, a right buckle (not illustrated) of the center seat 17 (see FIG. 1). The second tongue is detachably locked to, for example, a left buckle (not illustrated) of the center seat 17. In this state, a chest of an occupant seated on the center seat 17 can be restrained by the webbing 54 between the anchor 53 and the second tongue. A waist of the occupant seated on the center seat 17 can be restrained by the webbing 54 between the first tongue and the second tongue. Therefore, the webbing 54 of the seat belt device 50 can restrain the occupant seated on the center seat 17.

In this state, the webbing 54 is stretched in a state of being pulled out from the first guide hole 82 of the escutcheon 81 in a pull-out direction (shearing direction) along the rail bottom 31 of the rear roof rail 27, as indicated by an arrow A. In other words, the webbing 54 pulled out from the first guide hole 82 as indicated by the arrow A is disposed along the rail bottom 31 of the rear roof rail 27 between the first guide hole 82 of the escutcheon 81 and the second guide hole 55 of the anchor 53. The pull-out direction (that is, an arrow A direction) is a direction intersecting (in the embodiment, for example, orthogonal or substantially orthogonal to) an axis 68 of the first fastening bolt 67.

Hereinafter, the webbing 54 pulled out in the pull-out direction between the first guide hole 82 and the second guide hole 55 may be referred to as a "first webbing 54A".

In a state where the chest of the occupant is restrained by the webbing 54 between the anchor 53 and the second tongue, the webbing 54 is pulled out in a state of being stretched from the second guide hole 55 of the anchor 53. The webbing 54 pulled out from the second guide hole 55 as indicated by an arrow B is stretched in a stretching direction (that is, an arrow B direction) inclined at an acute angle $\theta$ with respect to the first webbing 54A between the second guide hole 55 and the second tongue. Hereinafter, the webbing 54 between the second guide hole 55 and the second tongue may be referred to as a "second webbing 54B".

As described above, the anchor 53 is disposed so as to change the stretching direction (the arrow B direction) of the second webbing MB that restrains the occupant in the center seat 17 by the webbing 54 to have the acute angle $\theta$ with respect to the pull-out direction (the arrow A direction) of the first webbing 54A.

As described above, according to the vehicle body upper structure 10 of the embodiment, the retractor main body 56 is housed in the internal space 36 of the rear roof rail as illustrated in FIGS. 2 and 4. Further, the retractor 51 is fixed to the rear roof rail 27 with the first fastening bolt 67 and the second fastening bolt 88. Therefore, it is possible to prevent the retractor 51 from protruding so as to protrude into a space of the vehicle interior 14 (that is, a vehicle interior space). As a result, it is possible to secure a large vehicle interior space of the vehicle Ve without being affected by the retractor 51.

Here, the rear roof rail 27 is a member having high rigidity and strength that forms the rear framework of the roof 25. Further, the first webbing 54A pulled out from the first guide hole 82 of the escutcheon 81 in the retractor 51 can be pulled out in the pull-out direction (the arrow A direction) orthogonal or substantially orthogonal to the axis 68 of the first fastening bolt 67. That is, the pull-out direction of the first webbing 54A can be a shearing direction orthogonal or substantially orthogonal to the axis 68 of the first fastening bolt 67.

Therefore, for example, it is possible to increase strength and rigidity of the rear roof rail 27 against a load F1 acting on the rear roof rail 27 from the first fastening bolt 67. As a result, it is possible to reduce reinforcement and weight of the retractor mounting portion 31a for mounting the retractor 51 to the rear roof rail 27 with the first fastening bolt 67.

In addition, the stretching direction (the arrow B direction) of the second webbing 54B that restrains the occupant seated on the center seat 17 (see FIG. 1) is changed to have the acute angle $\theta$ with respect to the pull-out direction (the arrow A direction) by the anchor 53.

Here, a reaction force F3 of a webbing load (belt load) F2 acting on the rear roof rail 27 via the anchor 53, the anchor bolt 92, and the like acts by the second webbing 54B restraining the occupant. In this reaction force F3, a first component force (vertical component) F4 orthogonal to the rear roof rail 27 can be made larger than a second component force (horizontal component) F5 along the rear roof rail 27. In other words, the second component force F5 along the rear roof rail 27 can be made smaller than the first component force F4 orthogonal to the rear roof rail 27.

Hereinafter, the belt load F2 acting on the rear roof rail 27 by the second webbing 54B restraining the occupant via the anchor 53, the anchor bolt 92, and the like may be referred to as a "belt stretching load F2", the first component force F4 may be referred to as a "large first component force F4", and the second component force F5 may be referred to as a "small second component force F5".

That is, the belt stretching load F2 can be dispersed into the large first component force F4 received by the rear roof rail 27 and the small second component force F5 received by the retractor 51. The large first component force F4 can be supported by the rear roof rail 27. The small second component force F5 acts on the retractor mounting portion 31a via the retractor 51 and the first fastening bolt 67. Therefore, it is possible to reduce a load acting on the retractor mounting portion 31a via the retractor 51 and the first fastening bolt 67 (that is, the small second component force F5). Accordingly, reinforcement and weight of the retractor mounting portion 31a can be further reduced.

The retractor 51 and the anchor 53 are coupled by the bracket 52. Therefore, a part of the small second component force F5 along the rear roof rail 27 can be handled and supported by the bracket 52. As a result, for example, it is not necessary to increase strength and rigidity of the retractor mounting portion 31a of the rear roof rail 27 more than necessary by reinforcement, and it is possible to further reduce reinforcement and weight of the retractor mounting portion 31a.

Further, the retractor 51 and the anchor 53 can be assembled to the rear roof rail 27 in a state of being integrally coupled by the bracket 52. Thus, workability of assembling the retractor 51 and the anchor 53 (that is, the seat belt device 50) can be improved.

Further, the retractor 51 is attached to the wide base end 52a with the base end 52a of the bracket 52 wider than the distal end 52b thereof. The anchor 53 is attached to the distal end 52b of the bracket 52 with the anchor bolt 92. Therefore, the small second component force F5 along the rear roof rail 27 can be transmitted to the distal end 52b of the bracket 52 via the anchor bolt 92. Therefore, the small second component force F5 along the rear roof rail 27 can be more favorably dispersed toward the bracket 52. As a result, the distal end 52b side of the bracket 52 can be made narrower than the base end 52a side, and the bracket 52 can be made lightweight.

In addition, the first fastening hole 85 is formed in the bracket 52, and the bracket 52 is attached to the rear roof rail 27 with the second fastening bolt 88 inserted into the first fastening hole 85. Further, this first fastening hole 85 is disposed between the anchor 53 and the retractor 51. As a result, for example, even when the anchor 53 and the retractor 51 are largely separated to some extent, the second fastening bolt 88 can suppress vertical fluttering of the bracket 52 due to, for example, vehicle body vibration or a load acting from the first webbing 54A.

The wide portion 76 is formed in the bracket 52. Therefore, the wide portion 76 of the bracket 52 is formed wider than the distal end 52b over the range L1 from the distal end 52b to the first fastening hole 85 and the range L2 from the first fastening hole 85 to the base end 52a. Thus, for example, the first fastening hole 85 into which the second fastening bolt 88 can be inserted can be formed in the wide portion 76. Therefore, in the bracket 52, a periphery of a fastening portion 76c attached to the rear roof rail 27 by the second fastening bolt 88 (that is, a periphery of the first fastening hole 85) can be reinforced by the wide portion 76.

Therefore, for example, strength and rigidity of the bracket 52 against a force applied in the direction in which the bracket 52 is separated from the rear roof rail 27 (for example, the vertical direction) by vehicle body vibration or a load acting from the webbing 54 can be enhanced.

Here, for example, by providing the first fastening hole 85 in the wide portion 76, strength and rigidity of the periphery of the first fastening hole 85 can be suppressed to be low. Therefore, the endless bead 86 is formed in the wide portion 76 of the bracket 52, and the first fastening hole 85 is surrounded by the bead 86. As a result, the strength and rigidity of the periphery of the first fastening hole 85 can be secured by the endless bead 86.

Further, the outer end 27a of the rear roof rail 27 is overlapped with the upper end 12a of the rear pillar 12 to ensure high strength and rigidity of the overlapped rail bottom overlapped portion 42. Further, the anchor 53 is attached to the rail bottom overlapped portion 42 with the anchor bolt 92. Therefore, the large first component force F4 orthogonal to the rear roof rail 27 in the belt stretching load F2 can be handled and supported by the rail bottom overlapped portion 42.

As a result, for example, it is not necessary to increase the strength and rigidity of the rail bottom overlapped portion 42 to which the anchor 53 is attached and a periphery of the rail bottom overlapped portion 42 more than necessary by reinforcement, and an increase in weight due to the reinforcement can be suppressed.

The technical scope of the present invention is not limited to the above embodiments, and various modifications can be made without departing from the gist of the present invention.

In addition, it is possible to appropriately replace the constituent elements in the embodiment with well-known constituent elements without departing from the gist of the present invention, and the above-described modifications may be appropriately combined.

What is claimed is:

1. A vehicle body upper structure comprising:
    a rear roof rail extending along a roof panel of a vehicle body;
    a retractor housed inside the rear roof rail and fixed to the rear roof rail by a mounting member;
    a seat belt capable of pulling out in a pull-out direction intersecting an axis of the mounting member; and
    a through ring configured to change a stretching direction of the seat belt that restrains an occupant with the seat belt to have an acute angle with respect to the pull-out direction.

2. The vehicle body upper structure according to claim 1, further comprising:
    a bracket configured to couple the retractor and the through ring.

3. The vehicle body upper structure according to claim 2, wherein
    the bracket includes one end to which the through ring is attached by a through ring mounting member and another end to which the retractor is attached, and
    the another end side is wider than the one end side.

4. The vehicle body upper structure according to claim 2, wherein
    the bracket extends in a vehicle width direction along the rear roof rail and includes a fastening hole into which a fastening member that attaches the bracket to the rear roof rail is able to be inserted, and
    the fastening hole is located between the through ring and the retractor in the vehicle width direction.

5. The vehicle body upper structure according to claim 4, wherein
    the bracket includes one end to which the through ring is attached by a through ring mounting member and another end to which the retractor is attached, and
    a wide portion wider than the one end from the one end to the fastening hole and from the fastening hole to the another end.

6. The vehicle body upper structure according to claim 5, wherein
    the wide portion includes an endless bead surrounding the fastening hole.

7. The vehicle body upper structure according to claim 1, wherein
    the rear roof rail is supported by a rear pillar,
    the rear roof rail has an end on an outer side in a vehicle width direction overlapped with an upper end of the rear pillar, and
    the through ring is attached to a portion where the upper end and the end overlap with each other by a through ring mounting member.

* * * * *